(12) United States Patent
Hayashi

(10) Patent No.: US 6,457,828 B1
(45) Date of Patent: Oct. 1, 2002

(54) DISPLAY OPTICAL APPARATUS

(75) Inventor: Kohtaro Hayashi, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/551,812

(22) Filed: Apr. 18, 2000

(30) Foreign Application Priority Data

Apr. 21, 1999 (JP) .......................................... 11-113047
Apr. 22, 1999 (JP) .......................................... 11-114402

(51) Int. Cl.$^7$ .............................................. G03B 21/14
(52) U.S. Cl. ................................ 353/20; 353/31; 349/5
(58) Field of Search .......................... 353/31, 33, 34, 353/37, 20; 349/5, 8, 9

(56) References Cited

U.S. PATENT DOCUMENTS

| | | | |
|---|---|---|---|
| 5,161,042 A | | 11/1992 | Hamada ........................ 359/41 |
| 5,566,007 A | * | 10/1996 | Ikeda et al. .................... 359/40 |
| 5,623,349 A | | 4/1997 | Clarke ............................ 349/8 |
| 5,633,737 A | * | 5/1997 | Tanaka et al. ................... 349/5 |
| 5,726,719 A | * | 3/1998 | Tanaka et al. ................... 349/8 |
| 5,757,341 A | | 5/1998 | Clarke et al. .................. 345/32 |
| 5,865,521 A | * | 2/1999 | Hashizume et al. ............ 353/38 |
| 6,050,689 A | * | 4/2000 | Nakamura et al. ............. 353/31 |
| 6,116,739 A | * | 9/2000 | Ishihara et al. ................ 353/31 |
| 6,174,060 B1 | * | 1/2001 | Imaoka et al. ................. 353/31 |
| 6,281,867 B2 | * | 8/2001 | Kurematsu et al. ............. 349/8 |
| 6,304,381 B1 | * | 10/2001 | Hayashi ........................ 359/495 |

* cited by examiner

Primary Examiner—William Dowling
(74) Attorney, Agent, or Firm—Sidley Austin Brown & Wood LLP

(57) ABSTRACT

A display optical apparatus has an illumination optical system, a reflection-type light modulation device, an illumination/projection separation optical system, a microcylinderlens array, and a projection optical system. The illumination optical system, including a color separation device, separates light polarized in a predetermined polarization direction into light of different wavelength ranges traveling in different directions by use of the color separation device and emits the thus separated light as illumination light. The reflection-type light modulation device displays an optical image. The illumination/projection separation optical system directs the illumination light emitted from the illumination optical system to the reflection-type light modulation device and emits the light reflected from the reflection-type light modulation device as projection light. The microcylinderlens array, disposed between the color separation device and the reflection-type light modulation device, focus the illumination light on the reflection-type light modulation device in such a way that light of different wavelength ranges is focused separately. The projection optical system focuses the projection light emitted from a polarization beam splitter on an image plane. Here, the plane including the central ray of the illumination light and the central ray of the projection light is substantially perpendicular to the plane including the direction in which the color separation device performs color separation.

9 Claims, 12 Drawing Sheets

DISPLAY OPTICAL APPARATUS

This application is based on applications Nos. H11-113047 and H11-114402 filed in Japan on Apr. 21, 1999 and Apr. 22, 1999 respectively, the entire content of which is hereby incorporated by reference.

BACKGROUND OF THE INVENTION

1. Field of the Invention

The present invention relates to a display optical apparatus for projecting an image displayed on a reflection-type display panel.

2. Description of the Prior Art

One of conventional means of displaying an image is a projection-type display optical apparatus. Today, in display optical apparatuses of this type, a so-called reflection-type display panel such as a reflection-type liquid crystal display panel is employed. In addition, an illumination optical system is employed to illuminate efficiently and uniformly an optical image displayed on such a reflection-type display panel. Moreover, a microlens array or the like is disposed immediately in front of the reflection-type display panel to direct the illumination light emitted from the illumination optical system to the reflection-type display panel.

For example, a reflection-type display panel of a so-called single-panel type is used that has R, G, and B pixels arranged in a recurring pattern. Illumination light is separated into R, G, and B light beforehand, and the thus separated R, G, and B light is directed at different angles into individual microlenses of a microlens array, separately for each pixel group (here, a pixel group denotes a set of three different, i.e. R, G, and B, pixels) or for every predetermined number of pixel groups, so that the R, G, and B light is condensed individually onto the R, G, and B pixels of the reflection-type display panel.

However, in this construction, since the reflection-type display panel is illuminated with R, G, and B light that is shone thereon at different angles, the illumination light fans out greatly in the direction in which it is separated. In addition, since the pixels are illuminated through the microlenses, not only the illumination light fans out greatly in the direction in which it is separated, but also the light that has reflected from the reflection-type display panel, i.e. the projection light, then passes through the microlenses and thus fans out in another direction.

In a construction as described above, where a reflection-type display panel is illuminated with illumination light that fans out and the projection light reflected from the reflection-type display panel needs to be handled separately from the illumination light, it is necessary either to shine the illumination light on the reflection-type display panel at a large angle of incidence from an oblique direction and extract the light reflected regularly from the reflection-type display panel as projection light, or to use a polarization beam splitter that can handle light that fans out greatly.

However, illuminating a reflection-type display panel with illumination light shone thereon at a large angle of incidence tends to cause image distortion, and therefore it is difficult to project an image displayed on the reflection-type display panel onto a screen properly by directing the projection light obtained from such illumination light through a projection optical system. On the other hand, a polarization beam splitter that can handle light that fans out greatly cannot be realized with a conventional structure using a dielectric multilayer film. Normally, in a polarization beam splitter, as the angle of incidence varies, the transmittance for light of a given wavelength range incident thereon varies greatly. Therefore, with illumination light that fans out greatly and with the projection light obtained therefrom, particularly when a wide wavelength range is involved, it is difficult to handle the illumination and projection light separately.

SUMMARY OF THE INVENTION

An object of the present invention is to provide a display optical apparatus that can minimize the fanning out of illumination and projection light in the direction in which they are separated and that can be built with illumination and projection optical systems of simple construction.

Another object of the present invention is to provide a display optical apparatus that allows separate handling of illumination and projection light by the use of an ordinary polarization beam splitter even with illumination light that fans out greatly and with the projection light obtained therefrom, or even when a wide wavelength range is involved, and that can be built with illumination and projection optical systems of simple construction.

To achieve the above object, according to one aspect of the present invention, a display optical apparatus is provided with: an illumination optical system, including a color separation device, for separating light polarized in a predetermined polarization direction into light of different wavelength ranges traveling in different directions by use of the color separation device and emitting the thus separated light as illumination light; a reflection-type light modulation device for displaying an optical image; an illumination/projection separation optical system for directing the illumination light emitted from the illumination optical system to the reflection-type light modulation device and for emitting the light reflected from the reflection-type light modulation device as projection light; a microcylinderlens array, disposed between the color separation device and the reflection-type light modulation device, for focusing the illumination light on the reflection-type light modulation device in such a way that light of different wavelength ranges is focused separately; and a projection optical system for focusing the projection light emitted from a polarization beam splitter on an image plane. Here, the plane including the central ray of the illumination light and the central ray of the projection light is substantially perpendicular to the plane including the direction in which the color separation device performs color separation.

According to another aspect of the present invention, a display optical apparatus is provided with: an illumination optical system, including a color separation device, for separating light polarized in a predetermined polarization direction into light of different wavelength ranges traveling in different directions by use of the color separation device and emitting the thus separated light as illumination light; a reflection-type light modulation device for displaying an optical image; a polarization beam splitter having a polarization separation surface for directing the illumination light emitted from the illumination optical system to the reflection-type light modulation device and for emitting the light reflected from the reflection-type light modulation device as projection light, with the illumination light shone on the polarization separation surface in such a way that light of shorter wavelengths is shone thereon at larger angles of incidence; and a projection optical system for focusing the projection light emitted from the polarization beam splitter on an image plane.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
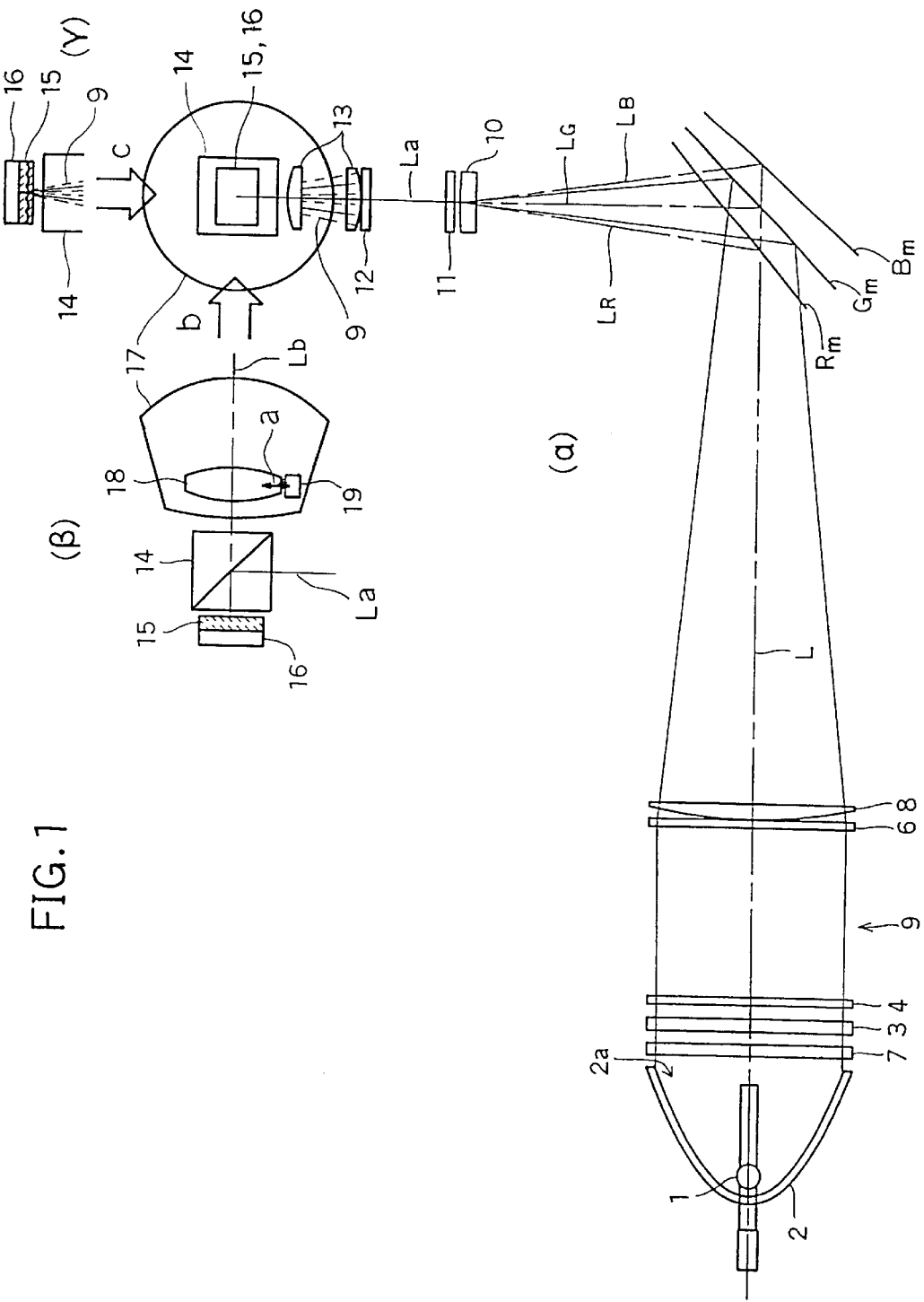
FIG. 1 is a diagram schematically showing the construction of the display optical apparatus of a first embodiment of the invention.

Hereinafter, embodiments of the present invention will be described with reference to the accompanying drawings. FIG. 1 is a diagram schematically showing the construction of the display optical apparatus of a first embodiment of the invention. In this figure, at ($\alpha$) is shown a front view showing the overall construction, focusing in particular on the illumination optical system, at ($\beta$) is shown a left side view of the illumination/projection separation optical system and the projection optical system described later, as seen from the direction indicated the arrow b, and at ($\gamma$) is shown a plan view of a part of the illumination/projection separation optical system, as seen from the arrow c.

At ($\alpha$) in the figure, reference numeral 1 represents a light source, and reference numeral 2 represents a reflector disposed so as to surround the light source 1. Reference numeral 7 represents a UV/IR cut filter disposed so as to cover the light exit opening 2a of the reflector 2 to cut the ultraviolet and infrared radiation included in the light emitted from the light source 1 and reflected from the reflector 2. Behind the UV/IR cut filter 7 (i.e., in the figure, on the right side thereof) are disposed, from the UV/IR cut filter side, a birefringent diffraction grating 3, a first lens array 4, then somewhat away therefrom, a second lens array 6, and then immediately behind it, a first superimposing lens 8.

Though not shown here, the first lens array 4 has lens cells arranged in a formation shaped like a substantially square grid, and the second lens array 6 has lens cells arranged in a formation shaped like a rectangular grid divided along different directions from the first lens array 4. The birefringent diffraction grating 3 performs polarization separation on the light 9 coming from the light source 1 and the reflector 2 to separate the light 9 in the direction of the longer sides of the individual lens cells of the second lens array 6. The light 9 coming from the light source 1 and the reflector 2 is, while traveling through the birefringent diffraction grating 3, the first lens array 4, and then the second lens array 6, subjected to polarization conversion and thereby its polarization plane is made uniform. Thus, these optical elements together constitute a polarization conversion device. The relationship among these optical elements will be described in detail later.

The second lens array 6 and the first superimposing lens 8 disposed immediately behind it allow the images formed on the individual lens cells of the first lens array 4 to be superimposed on one another in the vicinity of the focal point (described later) of the first superimposing lens 8. The first superimposing lens 8 may be formed integrally with the second lens array 6. Instead of using the birefringent diffraction grating 3, it is also possible to dispose a birefringent prism array or the like between the first and second lens arrays 4 and 6. The optical elements described above, starting with the first lens array 4 and ending with the first superimposing lens 8, together constitute a first integrator optical system having an optical axis L. At the focal point of the first superimposing lens 8, a condenser lens 10 is disposed.

Between the first superimposing lens 8 and the condenser lens 10, dichroic mirrors $R_m$, $G_m$, and $B_m$ that reflect light of the frequency ranges corresponding to R (red), G (green), and B (blue), respectively, are disposed with different inclinations. Thus, the light 9 having passed through the first superimposing lens 8 along the optical axis L is reflected by the dichroic mirrors $R_m$, $G_m$, and $B_m$ individually so as to reach the condenser lens 10 by traveling along differently inclined optical axes $L_R$, $L_G$, and $L_B$, respectively. Instead of the dichroic mirror $B_m$, it is also possible to use a total-reflection mirror.

Immediately behind the condenser lens 10 (i.e., in the figure, above it), a third lens array 11 is disposed. The third lens array 11 has lens cells arranged in a formation shaped like a rectangular grid having substantially the same aspect ratio as the display panel described later. The lens cells of the third lens array 11 are divided into one to three columns of lens cells in the direction of the longer sides of the third lens array 11; for example, in this embodiment, they are divided into two columns, as will be described later.

Behind the third lens array 11, somewhat away therefrom, a fourth lens array 12 is disposed. The fourth lens array 12 has lens cells arranged in a formation shaped like a rectangular grid similar to that of the third lens array 11, though the formations of the third and fourth lens arrays 11 and 12 do not necessarily have to be exactly (i.e. geometrically) similar to each other. The fourth lens array 12 and a second superimposing lens unit 13 disposed immediately behind it allow the images formed on the individual lens cells of the third lens array 11 to be superimposed on one another on the display panel described later. The second superimposing lens unit 13 also serves to achieve telecentric illumination of the display panel. The optical elements described above, starting with the third lens array 11 and ending with the second superimposing lens unit 13, together constitute a second integrator optical system having an optical axis La.

Behind the second superimposing lens unit 13 (i.e., in the figure, above it), a PBS (polarization beam splitter) prism 14 is disposed. The PBS prism 14 reflects S-polarized light and transmits P-polarized light. The light 9 coming from the light source 1 and the reflector 2 is, as a result of the polarization conversion mentioned above, wholly S-polarized when it enters the PBS prism 14. Thus, most of the light 9 is reflected by the PBS prism 14 and is thereby directed to a display panel 16 disposed on the left side thereof at ($\beta$) in the figure.

Immediately in front of the display panel 16, a birefringent microcylinderlens array 15 is disposed that is made of a birefringent optical material. This birefringent microcylinderlens array 15 has cylinder lenses arranged in such a way that their longer sides are aligned vertically along the plane of the figure at ($\beta$) in the figure and aligned laterally along the plane of the figure at ($\gamma$) in the figure.

The light 9 having been subjected to color separation achieved by the above-mentioned dichroic mirrors and the third and fourth lens arrays then illuminates the display panel 16 through this birefringent microcylinderlens array 15 in such a way that light of different colors illuminates different pixels, as will be described in detail later. As a result, the display panel 16 as a whole is illuminated by recurrent stripes of R, G, and B light and thereby the display data of those three colors is displayed individually by the pixels illuminated by the light of the corresponding colors.

The display panel 16 is a reflection-type liquid crystal display panel that reflects pixel by pixel the light shone thereon with (for "on" pixels) or without (for "off" pixels) rotating the polarization plane thereof in accordance with the given display data. The portion of the reflected light that corresponds to "off" pixels remains S-polarized, and therefore, when it returns through the birefringent microcylinderlens array 15 to the PBS prism 14, it is reflected by the PBS prism 14 so as to be directed back toward the light source. On the other hand, the portion of the reflected light that corresponds to "on" pixels is converted into P-polarized light, and therefore, when it returns through the birefringent microcylinderlens array 15 to the PBS prism 14, it is transmitted through the PBS prism 14 so as to be directed further to a projection optical system 17 having an optical axis Lb.

The projection optical system 17 projects the display data presented on the display panel 16 onto a screen (not shown). Part of the lens elements included in the projection lens unit constituting the projection optical system 17 are, as an image shift lens 18, driven at high speed in a direction perpendicular to the optical axis Lb, as indicated by an arrow "a", by an actuator 19. This helps enhance the resolution of the display data, as will be described in detail later.

As described above, in this embodiment, the PBS prism 14 serves as an illumination/projection separation optical system. Moreover, the plane including both the optical axis La that coincides with the central ray of the illumination light and the optical axis Lb that coincides with the central ray of the projection light, i.e. the plane of the figure at ($\beta$) in the figure (the plane along which the PBS prism bends the light beams), is made substantially perpendicular to the plane including the direction in which the illumination light is separated by the dichroic mirrors $R_m$, $G_m$, and $B_m$ serving as a color separation device, i.e. the plane of the figure at ($\alpha$) in the figure. This construction helps minimize the fanning out of the illumination and projection light in the direction in which they are separated. Moreover, the birefringent microcylinderlens array 15, owing to the characteristics of the cylinder lenses constituting it, helps limit the fanning out of the projection light to that occurring in the direction in which the illumination light is separated. This makes it possible to simplify the construction of the illumination and projection optical systems, as will be described later.

Figure 2:
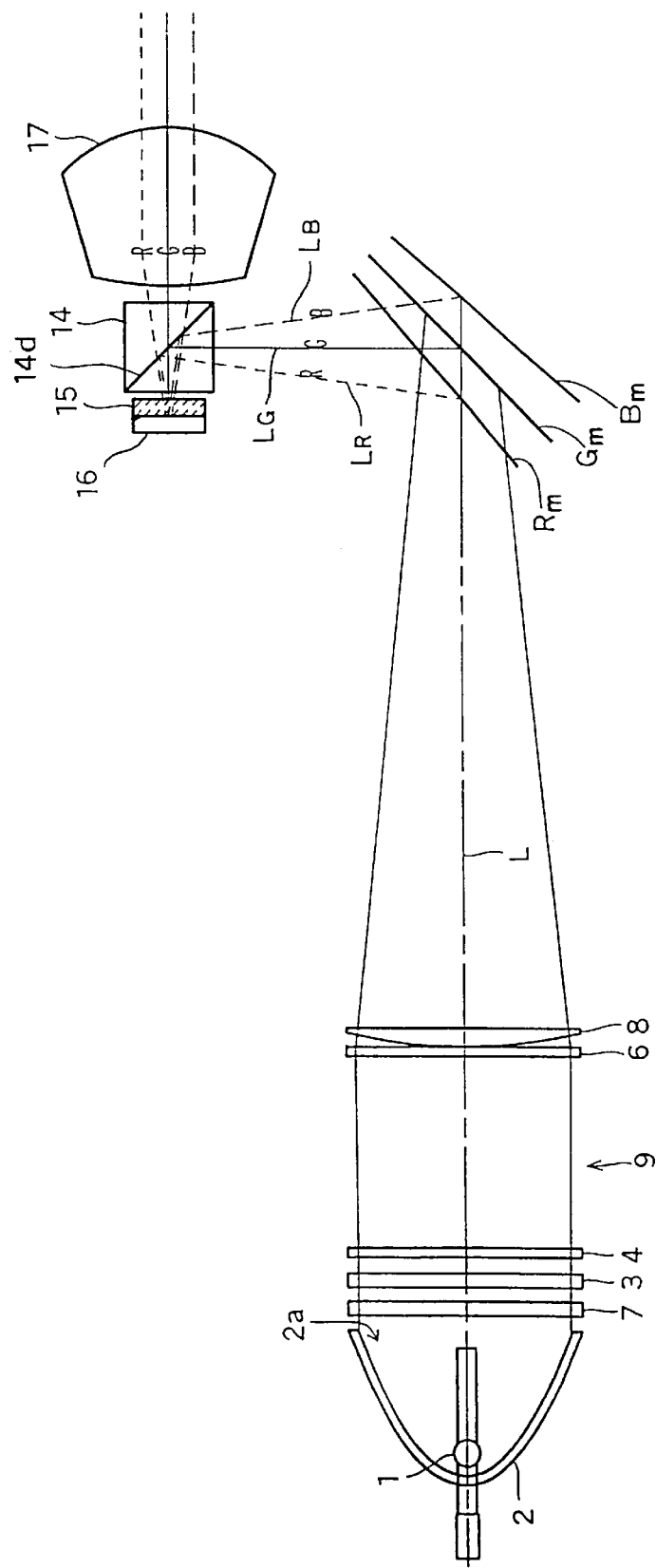
FIG. 2 is a diagram schematically showing the construction of the display optical apparatus of a second embodiment of the invention.

FIG. 2 is a diagram schematically showing the construction of the display optical apparatus of a second embodiment of the invention. In this figure, reference numeral 1 represents a light source, and reference numeral 2 represents a reflector disposed so as to surround the light source 1. Reference numeral 7 represents a UV/IR cut filter disposed so as to cover the light exit opening 2a of the reflector 2 to cut the ultraviolet and infrared radiation included in the light emitted from the light source 1 and reflected from the reflector 2. Behind the UV/IR cut filter 7 (i.e., in the figure, on the right side thereof) are disposed, from the UV/IR cut filter side, a birefringent diffraction grating 3, a first lens array 4, then somewhat away therefrom, a second lens array 6, and then immediately behind it, a superimposing lens 8.

Though not shown here, the first lens array 4 has lens cells arranged in a formation shaped like a grid, and the second lens array 6 has lens cells arranged in a formation shaped like a rectangular grid divided along different directions from the first lens array 4. The birefringent diffraction grating 3 performs polarization separation on the light 9 coming from the light source 1 and the reflector 2 to separate the light 9 in the direction of the longer sides of the individual lens cells of the second lens array 6. The light 9 coming from the light source 1 and the reflector 2 is, while traveling through the birefringent diffraction grating 3, the first lens array 4, and then the second lens array 6, subjected to polarization conversion and thereby its polarization plane is made uniform. Thus, these optical elements together constitute a polarization conversion device. The relationship among these optical elements will be described in detail later.

The second lens array 6 and the superimposing lens 8 disposed immediately behind it allow the images formed on the individual lens cells of the first lens array 4 to be superimposed on one another in the vicinity of the focal point (described later) of the superimposing lens 8. The superimposing lens 8 may be formed integrally with the second lens array 6. Instead of using the birefringent diffraction grating 3, it is also possible to dispose a birefringent prism array or the like between the first and second lens arrays 4 and 6. The optical elements described above, starting with the first lens array 4 and ending with the superimposing lens 8, together constitute a first integrator optical system having an optical axis L. At the focal point of the superimposing lens 8, a condenser lens 10 is disposed.

Between the superimposing lens 8 and a display panel 16, dichroic mirrors $R_m$, $G_m$, and $B_m$ that reflect light of the frequency ranges corresponding to R (red), G (green), and B (blue), respectively, and that thus serve as a color separation device are disposed with different inclinations. Behind the dichroic mirrors (i.e., in the figure, above them), a PBS (polarization beam splitter) prism 14 is disposed. Thus, the light 9 having passed through the first superimposing lens 8 along the optical axis L is reflected by the dichroic mirrors $R_m$, $G_m$, and $B_m$ individually so as to pass through the PBS prism 14 and then reach the display panel 16 by traveling along differently inclined optical axes $L_R$, $L_G$, and $L_B$ respectively. Instead of the dichroic mirror $B_m$, it is also possible to use a total-reflection mirror. In the figure, the light that appears as a result of the light 9 being reflected from the dichroic mirrors is omitted.

The PBS prism 14 reflects S-polarized light and transmits P-polarized light. The light 9 coming from the light source 1 and the reflector 2 is, as a result of the polarization conversion mentioned above, wholly S-polarized when it enters the PBS prism 14. Thus, most of the light 9 is reflected by the PBS prism 14 and is thereby directed to the display panel 16 disposed on the left side thereof in the figure.

Here, the light from the dichroic mirrors is shone on a dielectric multilayer film 14d provided along a diagonal direction of the PBS prism 14 so as to serve as a PBS film acting as a PBS separation surface in such a way that light of shorter wavelengths is shone thereon at larger angles of incidence, more specifically at increasingly large angles of incidence for R, G, and B light in this order. The dielectric multilayer film 14d is designed to exhibit characteristics that allow it to perform proper polarization separation on light of those different wavelength ranges shone thereon at such different angles of incidence, as will be described later.

Immediately in front of the display panel 16, a microlens array 15 is disposed. The light 9 having been subjected to color separation achieved by the above-mentioned dichroic mirrors then illuminates, as illumination light, the display panel 16 through this microlens array 15 in such a way that light of different colors illuminates different pixels, as will be described in detail later. As a result, the display panel 16 as a whole is illuminated by recurrent stripes of R, G, and B light and thereby the display data of those three colors is displayed individually by the pixels illuminated by the light of the corresponding colors.

The display panel 16 is a reflection-type liquid crystal display panel that reflects pixel by pixel the light shone thereon with (for "on" pixels) or without (for "off" pixels) rotating the polarization plane thereof in accordance with the given display data. The portion of the reflected light that corresponds to "off" pixels remains S-polarized, and therefore, when it returns through the microlens array 15 to the PBS prism 14, it is reflected by the PBS prism 14 so as to be directed back toward the light source. On the other hand, the portion of the reflected light that corresponds to "on" pixels is converted into P-polarized light, and therefore, when it returns through the microlens array 15 to the PBS prism 14, it is transmitted through the PBS prism 14 so as to be directed further to a projection optical system 17. Through this projection optical system 17, the display data displayed on the display panel 16 is projected on a screen (not shown).

Here, the display panel 16 is designed to exert a diffracting effect. The R, G, and B light illuminating the display panel 16 is reflected therefrom as projection light in such a way as to return to the PBS prism 14 by traveling individually along the same paths backward. Thus, the projection light is shone on the dielectric multilayer film 14d at the same angles of incidence as the illumination light, for all of R, G, and B light. This helps obtain satisfactory polarization separation characteristics, as will be described later.

Figure 3:
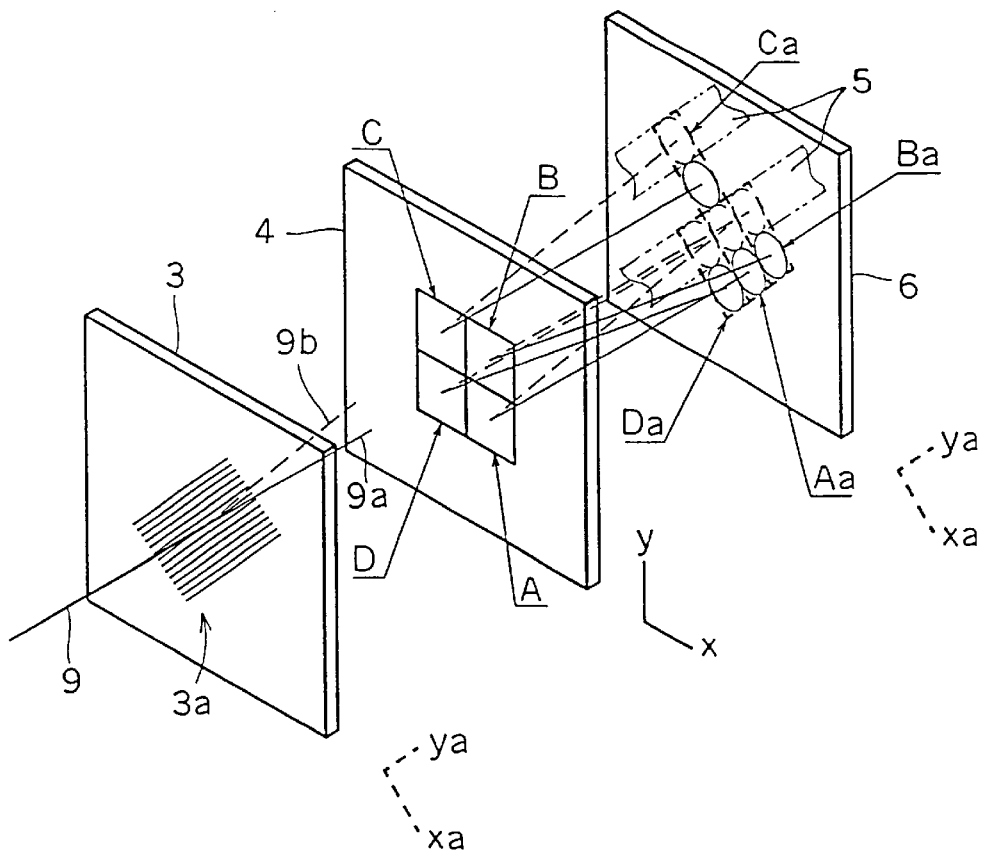
FIG. 3 is an exploded perspective view schematically showing the relationship among the birefringent diffraction grating and the first and second lens arrays in the first and second embodiments.

FIG. 3 is an exploded perspective view schematically showing the relationship among the birefringent diffraction grating and the first and second lens arrays in the first and second embodiments. In this figure, only part of the lens cells constituting the lens arrays are shown as their representatives. As shown in this figure, in the first and second embodiments, the directions of the sides of the individual lens cells of the first lens array 4 (indicated by solid lines) are not aligned with the directions of the sides of the individual lens cells of the second lens array 6 (indicated by broken lines). On the other hand, the direction of the blazes (grooves) 3a of the birefringent diffraction grating 3 are aligned with one of the directions of the sides of the individual lens cells of the second lens array 6. Specifically, the directions of the sides of the individual lens cells of the second lens array 6 are aligned with the directions of the diagonals of the individual lens cells of the first lens array 4.

The light 9 coming from the light source 1 and the reflector 2, which are disposed on the lower left side of the figure but not shown here, is separated, by the polarization separation action of the blazes 3a of the birefringent diffraction grating 3, into light 9a having a predetermined polarization plane, indicated by solid lines, and light 9b having a polarization plane perpendicular thereto, indicated by broken lines. These two types of light pass through the individual lens cells A, B, C, and D arranged in a substantially square grid-like formation in the first lens array 4 and then form, on each of the individual lens cells Aa, Ba, Ca, and Da arranged in a rectangular grid-like formation in the second lens array 6 and divided along different directions from the first lens array 4, a pair of a light-source image having the predetermined polarization plane and a light-source image having the polarization plane perpendicular thereto.

To achieve proper projection of the light-source images from the lens cells A, B, C, and D, arranged in one way, to the lens cells Aa, Ba, Ca, and Da, arranged in a different way therefrom, the individual lens cells A, B, C, and D of the first lens array 4 are each so arranged as to have a slight inclination or have a decentered lens vertex; that is, the vertex of these lens cells is deviated from the center thereof. Similarly, the individual lens cells Aa, Ba, Ca, and Da of the second lens array 6 are each so arranged as to have a slight inclination or have a decentered lens vertex.

In each pair, the two light-source images lie apart from each other in an exact row along the direction in which the birefringent diffraction grating 3 separates the light, i.e. in the direction of the longer sides of the individual lens cells of the second lens array 6. Moreover, as indicated by solid-line and broken-line ellipses (circles if seen from the front side of the lens array), these light-source images are projected on the individual lens cells of the second lens array 6 in such a way as to have an appreciable size. It is to be noted that, in the example under discussion, with respect to the first lens array 4 as seen from the light source side, a coordinate system is assumed to have a y axis pointing upward and an x axis pointing rightward, and, with respect to the second lens array 6 as seen from the light source side, a coordinate system is assumed to have a ya axis pointing toward the upper right and an xa axis pointing toward the lower right along the sides of the individual lens cells.

With this construction, it is possible to minimize the overlap between the light-source images projected on the second lens array 6, and thus to perform polarization conversion efficiently. Here, it is possible to make uniform the polarization plane of the separated light-source images, for example, by attaching strip-shaped half-wave plates 5 along the rows of the light-source images indicated by the broken-line ellipses. It is to be noted that, in the first and second embodiments, the light source has the same size and the lens cells of the second lens array 6 have the same area as in a conventional construction where the individual lens cells of the first and second lens arrays are arranged in the same way (with their sides aligned in the same directions).

Moreover, the first embodiment employs two-stage integrators, i.e. the first and second integrator optical systems, and therefore allows the lens cells of the lens arrays to be adapted to the aspect ratio of the display panel 16 by the second integrator optical system. Thus, the first lens array 4, disposed within the first integrator optical system, can have nearly square lens cells, and this enhances the effect of arranging the individual lens cells of the first lens array 4 and those of the second lens array 6 with their sides aligned in different directions.

Figure 4:
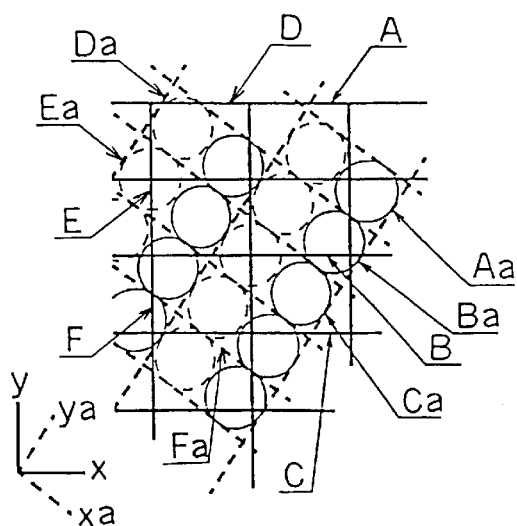
FIG. 4 is a front view schematically showing the positional relationship between the first and second lens arrays in a case where only one integrator is provided.

In a case where only one-stage integrator is employed as in the second embodiment, the first lens array 4 needs to have lens cells that are so shaped as to have an aspect ratio nearly equal to that of the display panel 16. Even in this case, by arranging the individual lens cells of the first lens array 4 and those of the second lens array 6 with their sides aligned in different directions, it is possible to achieve higher illumination efficiency than in a conventional construction where the sides are aligned in the same directions. FIG. 4 is a front view schematically showing the positional relationship between the first and second lens arrays in a case where only one-stage integrator is used, assuming that the aspect ratio is 4:3. As shown in this figure, one of the directions of the diagonals of the individual lens cells, indicated by solid lines, of the first lens array 4 coincides with the direction of the longer sides of the individual lens cells, indicated by broken lines, of the second lens array 6.

The light 9 coming from the light source 1 and the reflector 2 (neither is shown here) is separated, by the polarization separation action of the birefringent diffraction grating 3 (not shown), into light having a predetermined polarization plane and light having a polarization plane perpendicular thereto. These two types of light pass through the individual lens cells A, B, C, D, E, and F arranged in a grid-like formation having an aspect ratio of 4:3 in the first lens array 4 and then form, on each of the individual lens cells Aa, Ba, Ca, Da, Ea, and Fa arranged in a rectangular grid-like formation in the second lens array 6 and divided along different directions from the first lens array 4, a pair of a light-source image having the predetermined polarization plane and a light-source image having the polarization plane perpendicular thereto.

In each pair, the two light-source images lie apart from each other in an exact row along the direction in which the birefringent diffraction grating 3 separates the light. Moreover, as indicated by solid-line and broken-line circles, these light-source images are projected on the individual lens cells of the second lens array 6 in such a way as to have an appreciable size. It is to be noted that, in the example under discussion, with respect to the first lens array 4 as seen from the light source side, a coordinate system is assumed to have a y axis pointing upward and an x axis pointing rightward, and, with respect to the second lens array 6 as seen from the light source side, a coordinate system is assumed to have a ya axis pointing toward the upper right and an xa axis pointing toward the lower right along the sides of the individual lens cells.

In the first and second embodiments, as shown in FIG. 3, the direction in which the birefringent diffraction grating 3 exhibits birefringence is aligned with the direction along which the blazes 3a are formed, i.e. the ya-axis direction, and therefore the two types of light 9a and 9b after separation by polarization, indicated by solid and broken lines, respectively, and thus the two types of light-source images resulting therefrom, indicated by solid and broken ellipses, respectively, have polarization planes along the xa-axis and ya-axis directions, respectively. Before the two types of light enter the next optical system, their polarization planes need to be made to point uniformly in the y-axis direction. To achieve this, to the individual rows of the two types of light-source images, two corresponding types of strip-shaped half-wave plates are attached that have optical axes intersecting each other at 45°. In this way, the polarization planes of the two types of light are made uniform simultaneously.

As another way to make the polarization planes uniform, it is also possible, by the use of strip-shaped half-wave plates attached to the rows of one of the two types of light-source images, to make the polarization plane thereof uniform with that of the other, and then, by the use of a half-wave plate attached over the entire surface of the second lens array 6, to make the polarization planes of both types of light point in the y-axis direction. The direction in which the birefringent diffraction grating exhibits birefringence may be aligned not with the direction along which the blazes 3a are formed, i.e. the direction of the longer or shorter sides of the individual lens cells of the second lens array 6, but with the direction of the longer or shorter sides of the individual lens cells of the first lens array 4. Polarization separation may be achieved by any other method than by using a birefringent diffraction grating.

Figure 5:
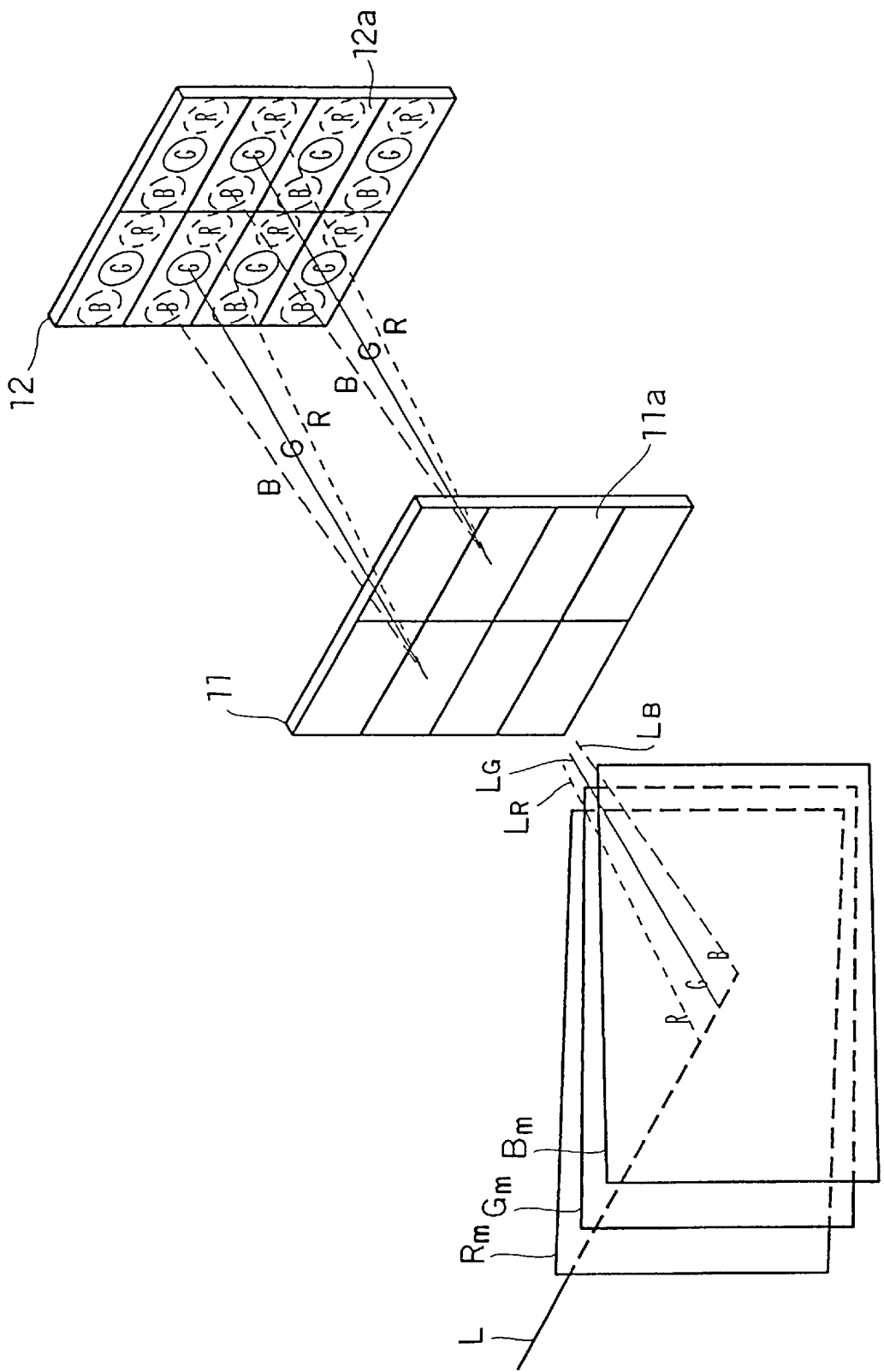
FIG. 5 is an exploded perspective view schematically showing the relationship among the dichroic mirror and the third and fourth lens arrays in the first embodiment.

FIG. 5 is an exploded perspective view schematically showing the relationship between the dichroic mirrors and the third and fourth lens arrays in the first embodiment. As shown in FIG. 1, between the first superimposing lens 8 disposed immediately behind the second lens array 6 and the condenser lens 10 (neither is shown in FIG. 5), the dichroic mirrors $R_m$, $G_m$, and $B_m$ that reflect light of the frequency ranges corresponding to R (red), G (green), and B (blue), respectively, are disposed with different inclinations. Thus, the light having passed through the first superimposing lens 8 along the optical axis L is reflected by the dichroic mirrors $R_m$, $G_m$, and $B_m$ individually so as to reach the condenser lens 10 by traveling along differently inclined optical axes $L_R$, $L_G$, and $L_B$, respectively.

As a result of the polarization conversion performed by the birefringent diffraction grating and the first and second lens arrays, the polarization plane of the light striking the individual dichroic mirrors is uniform, and this permits the dichroic mirrors to exhibit sharp color separation characteristics and thereby offer satisfactory color purity. A dichroic mirror exhibits different color separation characteristics for light having different polarization planes, and therefore shining non-polarized light on a dichroic mirror results in poor color separation and thus unsatisfactory color purity.

The light having reached the condenser lens 10 from different directions for its R, G, and B components is then focused, through the individual lens cells 11a of the third lens array 11 disposed immediately behind the condenser lens 10, on the individual lens cells 12a of the fourth lens array 12 disposed somewhat away behind it. Here, since the R, G, and B components travel in different directions, three separate light-source images are formed one for each component. In this embodiment, the third and fourth lens arrays 11 and 12 each have their lens cells arranged in two columns as shown in FIG. 5, and therefore such light-source images are formed individually in six columns, namely RGBRGB, in total.

In this embodiment, as described previously, two-stage integrators, i.e. the first and second integrator optical systems, are employed. This helps minimize variations in brightness (differences in intensity) among the light-source images focused on the fourth lens array 12 disposed within the second integrator optical system, and also minimize the number of light-source images and thus the number of divisions of the lens arrays. For example, in FIG. 5, for the G component, light-source images of identical intensity are formed in as few as two columns. It is to be noted that it is customary to divide the first lens array in four columns or more along the coarser sides (i.e. along the direction, either vertical or horizontal, in which fewer divisions are made), and divide the third lens array as few as two to four columns along the coarser sides.

Moreover, in this embodiment, the optical system is constituted of the first-stage integrator (the first integrator optical system), the dichroic mirrors for color separation, and the second-stage integrator (the second integrator optical system). In a case where only one-stage integrator is used, the optical system is usually constituted of, from the light source side, the integrator and then the dichroic mirrors. The purpose of disposing the second-stage integrator behind the dichroic mirrors in this embodiment is to suppress unnecessary color shades resulting from light striking the dichroic mirrors at different angles of incidence.

Figure 6:
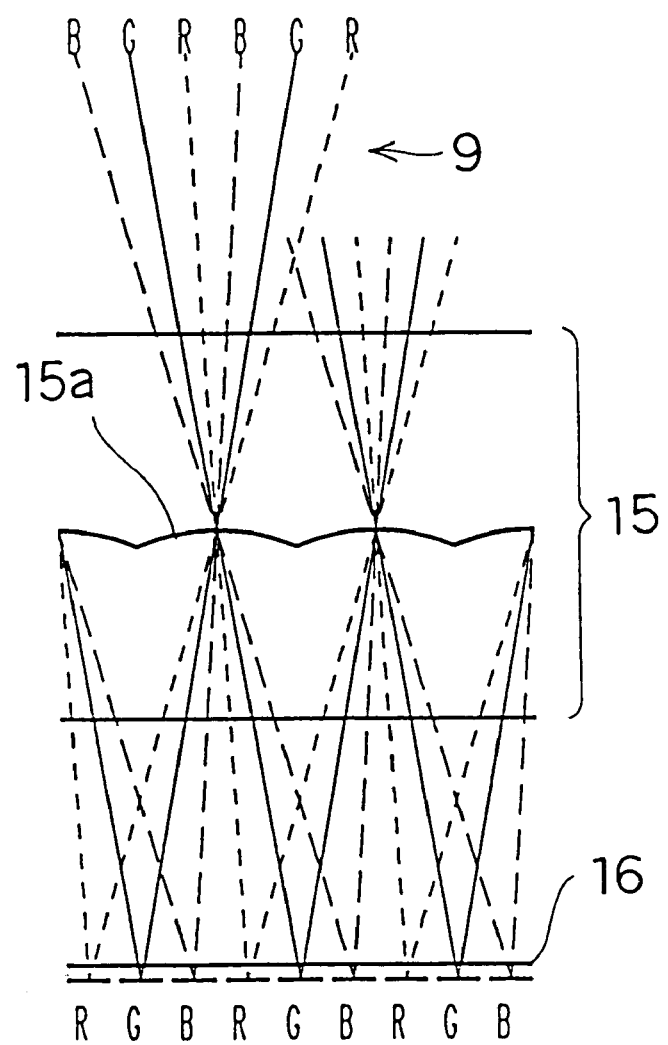
FIG. 6 is a diagram schematically showing the relationship between the birefringent microcylinderlens array and the display panel in the first embodiment.

FIG. 6 is a diagram schematically showing the relationship between the birefringent microcylinderlens array and the display panel in this embodiment. As shown also in FIG. 1, immediately in front of the display panel 16 is disposed a birefringent microcylinderlens array 15 that is made of a birefringent optical material. The light 9 having been subjected to color separation by the dichroic mirrors and the third and fourth lens arrays so as to be separated into R, G, and B components is then made to strike the display panel 16 by this birefringent microcylinderlens array 15 in such a way that the R, G, and B components illuminate the R, G, and B pixels, respectively, of the display panel 16. It is to be noted that FIG. 6 shows only parts of the birefringent microcylinderlens array 15 and the display panel 16, i.e. the remaining parts thereof extending further rightward and leftward are omitted.

In this embodiment, where two-stage integrators are used, no unnecessary color shades appear among the light-source images, and each of the microcylinderlenses 15a constituting the birefringent microcylinderlens array 15 handles as few as two or three (in this embodiment, two) columns of light-source images for each of the R, G, and B components. As a result, an appropriate distance of 200 to 300 μm is secured between the birefringent microcylinderlens array 15 and the pixels of the display panel 16, and thus a brightness above the diffraction limit, namely an f-number of 4 to 5, is obtained in each of the microlenses 15a, making satisfactory condensation of light possible.

A liquid crystal display panel of a modern design that is used as the display panel 16 typically has a pixel-to-pixel pitch of 10 to 20 μm to cope with the trend toward higher resolution. In this embodiment, the amount of blurring (1.22×wavelength λ×f-number) resulting from the diffraction occurring in each microcylinderlens is 2 to 3 μm, which is only a fraction of the pixel-to-pixel pitch. Thus, no appreciable blurring results from diffraction.

Figure 7:
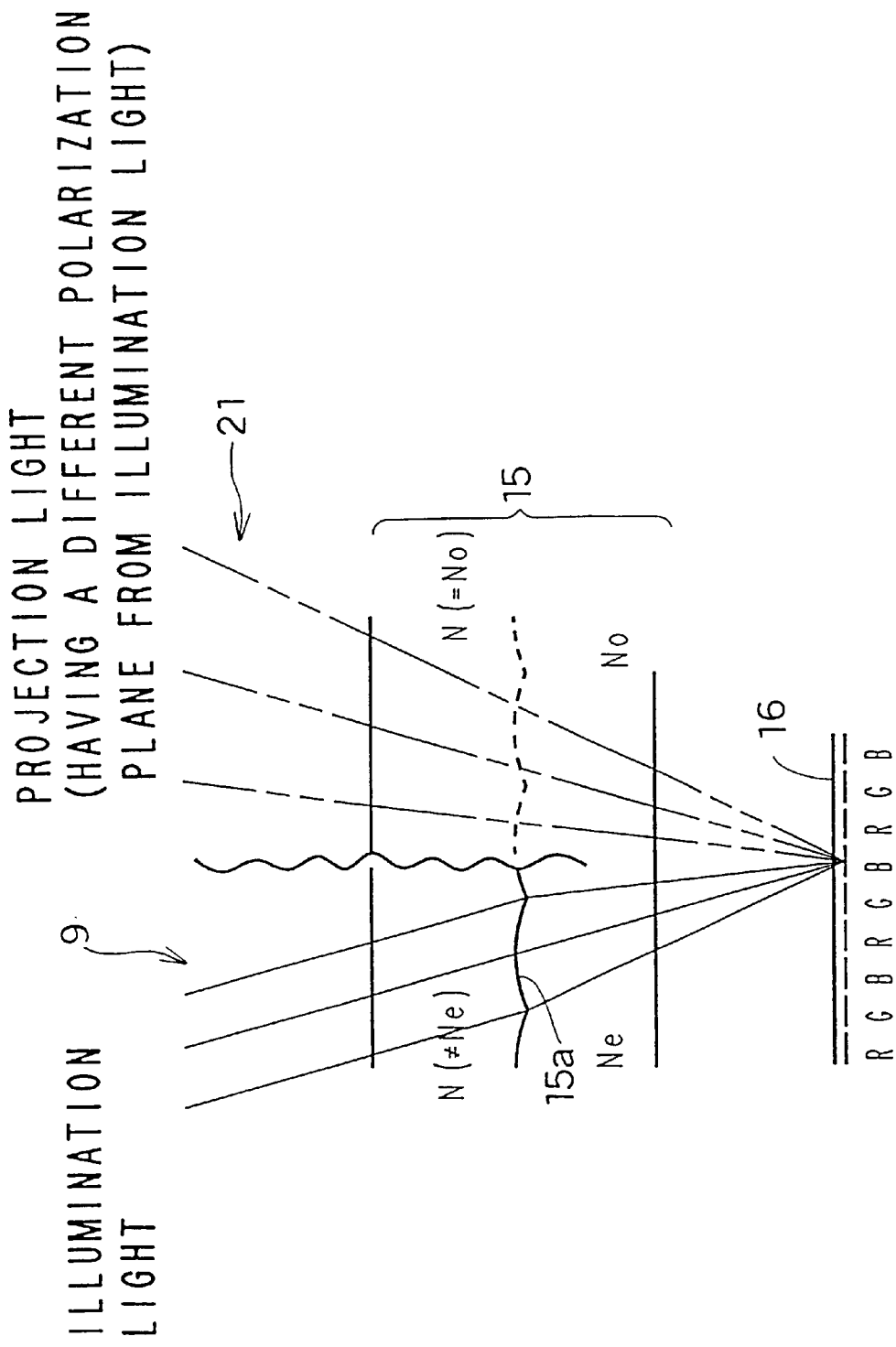
FIG. 7 is a diagram schematically showing the structure of the material of the birefringent microcylinderlens array used in the first embodiment.

FIG. 7 is a diagram schematically showing the structure of the material of the birefringent microcylinderlens array. In this embodiment, a reflection-type liquid crystal display panel is used as the display panel 16, and therefore both the light 9 (illumination light) traveling toward the display panel 16 and the light 21 (projection light) reflected from the display panel 16 pass through the birefringent microcylinderlens array 15 (or a lenticular optical element, i.e. an optical element having a lens-like section) disposed immediately in front of the display panel 16. Whereas the light 9 traveling toward the display panel 16 behaves as described above, the light 21 reflected therefrom, if left as it is, is disturbed by the birefringent microcylinderlens array 15, and this degrades image quality.

To cope with this, in this embodiment, the birefringent microcylinderlens array 15 is made of an isotropic optical material and a birefringent optical material. In FIG. 7, whereas the light 9 traveling toward the display panel 16 has a particular polarization plane, for example a polarization plane perpendicular to the plane of the figure, the light 21, i.e. the portion of the reflected light that is used to display an image, has a polarization plane rotated relative thereto, for example a polarization plane along the plane of the figure.

Here, suppose that, of the materials of which the birefringent microcylinderlens array 15 is made, the isotropic optical material, which is used above the microcylinderlenses 15a, has a refractive index N, and the birefringent optical material, which is used below the microcylinderlenses 15a, exhibits a refractive index Ne for the polarization plane of the light 9 and a refractive index No for the polarization plane of the light 21. Then, if N=No, the birefringent microcylinderlens array 15 acts as a microcylinderlens array toward the light 9 and acts as a simple transparent flat plate toward the light 21. In this way, despite the use of a reflection-type display panel, it is possible to prevent degradation of the image quality of the light 21.

In FIG. 7, to make the point easier to grasp, the light 9 is illustrated as striking the display panel 16 from an oblique direction and then reflecting as the light 21 in an oblique direction on the opposite side. However, in reality, the principal optical axes of both of the light 9 and 21 are perpendicular to the display panel 16. It is to be noted that FIG. 7 shows only parts of the birefringent microcylinderlens array 15 and the display panel 16, i.e. the remaining parts thereof extending further rightward and leftward are omitted. The optical elements thus far described, starting with the light source 1 and ending with the birefringent microcylinderlens array 15, together constitute an illumination optical system.

Figure 8:
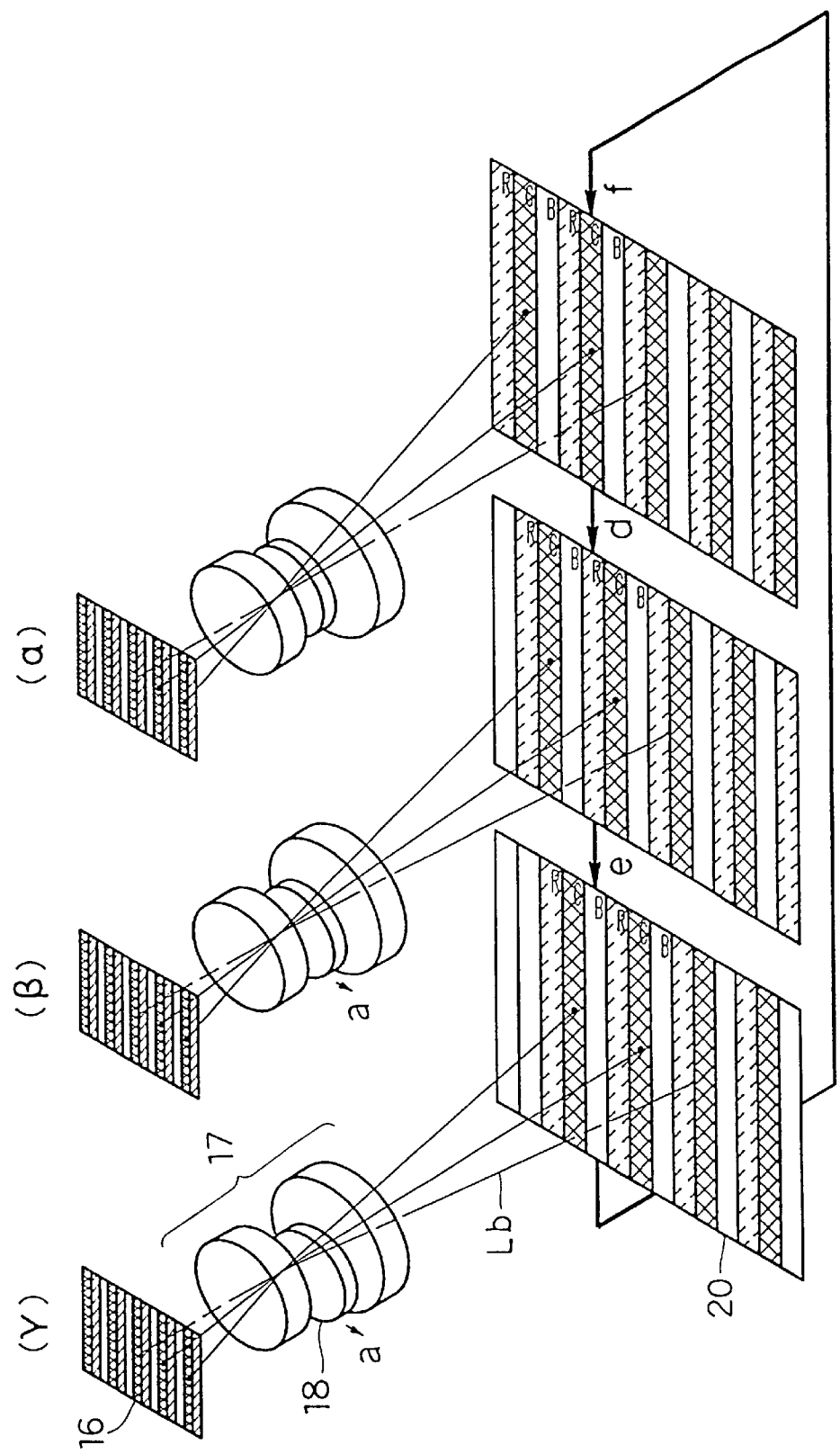
FIG. 8 is a perspective view schematically showing the principle of how pixel shifting is achieved in the projection optical system used in the first embodiment.

FIG. 8 is a perspective view schematically showing the principle of pixel shifting performed in the projection optical system used in this embodiment. In this embodiment, only a single display panel 16 is used. Therefore, to achieve display with resolution corresponding to the XGA format (1024 by 768 pixels), as many pixels are needed for each of R, G, and B colors, and thus the single display panel theoretically needs to have three times the number of pixels required in the XGA format. This makes the display panel unduly large and expensive. To avoid this, although a single display panel is used that has just so many pixels as required in the XGA format, colored display in the XGA format is achieved by shifting the pixels displayed on the screen at high speed.

Specifically, part of the projection optical system 17 shown in FIG. 8 is, as an image shift lens 18, driven at high speed in a direction perpendicular to the optical axis Lb as indicated by arrows a in such a way that, if attention is concentrated on the rows on the screen 20 that are initially illuminated by the G component as shown at (α) in the figure, the same rows are then (as indicated by an arrow d) illuminated by the R component as shown at (β), then (as indicated by an arrow e) illuminated by the B component as shown at (γ), then (as indicated by an arrow f) illuminated by the G component again as shown at (α), and so forth. In this way, three states are switched cyclically from one to the next at high speed, and what is displayed is changed according as the states are switched.

The image shift lens 18 is driven by the actuator 19 shown in FIG. 1 through a stroke of the same order as the pixel size, i.e. from 10 μm to tens of microns, at a time. As the actuator, for example an MC (moving coil), MM (moving magnet), or the like is used because it offers a high output and is thus suitable for high-speed driving.

Figure 9:
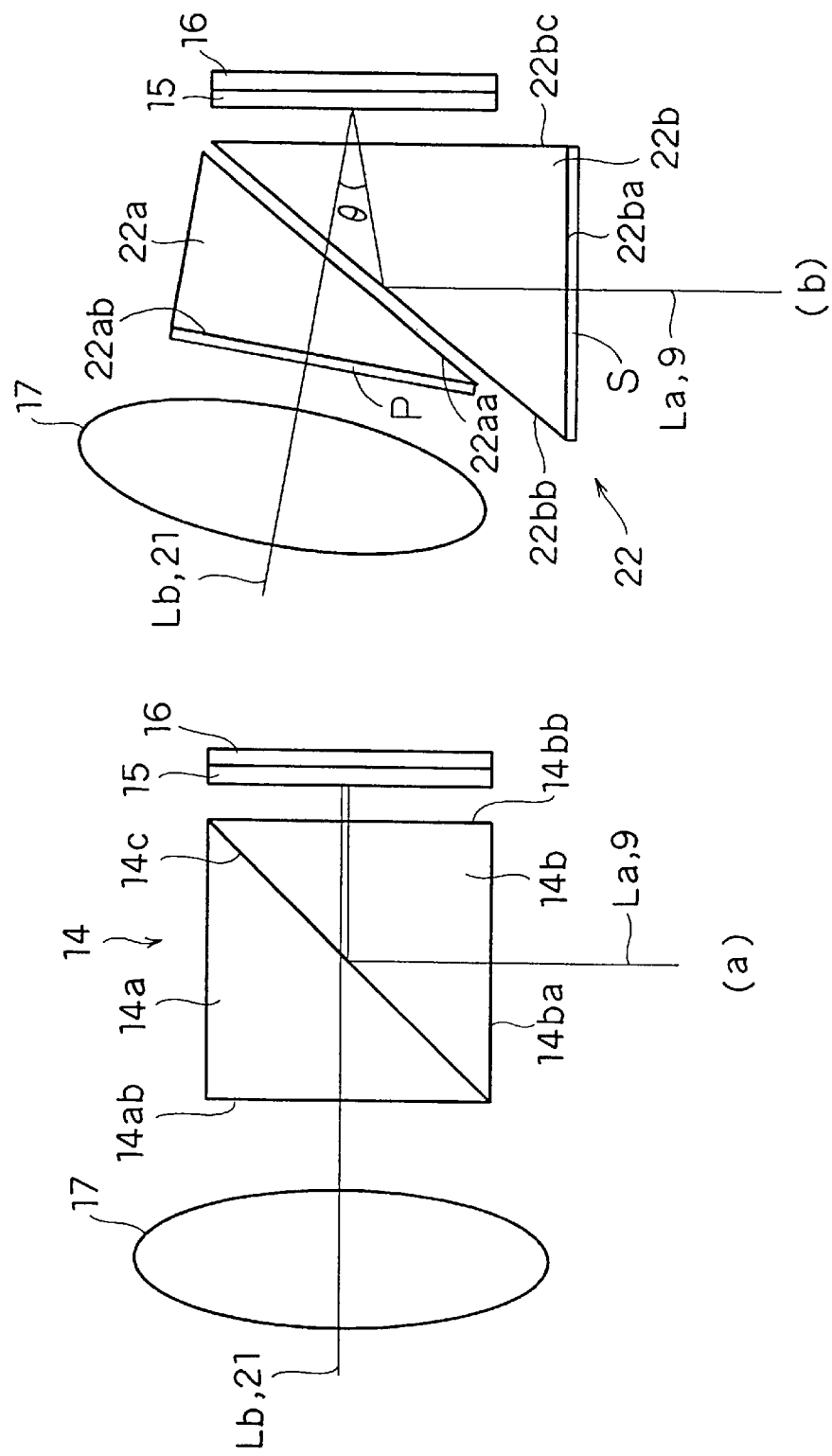
FIGS. 9A and 9B are diagrams schematically showing the construction of the illumination/projection separation optical system used in the first embodiment.

FIGS. 9A and 9B are diagrams schematically showing the construction of the illumination/projection separation optical system used in this embodiment. FIG. 9A shows a case where a PBS prism is used, and FIG. 9B shows a case where a TIR (total-reflection) prism is used. As shown in FIG. 9A, the PBS prism 14 has the shape of a rectangular parallelepiped as a whole, and is composed of two prisms 14a and 14b, each having the shape of a triangular prism and made of glass or the like, that are cemented together at their surfaces corresponding to the hypotenuses of isosceles triangles with a dielectric multilayer film 14c sandwiched between them. The prism 14b has an entrance surface 14ba and an entrance/exit surface 14bb; the prism 14a has an exit surface 14ab. The dielectric multilayer film 14c has the property of, for example, reflecting S-polarized light and transmitting P-polarized light.

As described earlier in connection with FIG. 1, in a case where a PBS prism 14 as described above is used, as shown in FIG. 9A, first, the light 9 formed into substantially uniformly S-polarized light by the illumination optical system is directed to the prism 14b along the optical axis La so that the light 9 enters the prism 14b through the entrance surface 14ba thereof. Then, most of the light 9 is reflected from the dielectric multilayer film 14c, exits from the prism 14b through the entrance/exit surface 14bb thereof, and travels toward the display panel 16. Immediately in front of the display panel 16 is disposed the birefringent microcylinderlens array 15.

The display panel 16 is a reflection-type liquid crystal display panel that reflects pixel by pixel the light shone thereon with (for "on" pixels) or without (for "off" pixels) rotating the polarization plane thereof in accordance with the given display data. The portion of the reflected light that corresponds to "off" pixels remains S-polarized, and therefore, when it returns through the birefringent microcylinderlens array 15 to the prism 14b, entering it through the entrance/exit surface 14bb thereof, it is reflected by the dielectric multilayer film 14c so as to be directed back toward the light source.

On the other hand, the portion of the reflected light that corresponds to "on" pixels is converted into P-polarized light, and therefore, when it returns through the birefringent microcylinderlens array 15 to the prism 14b, entering it through the entrance/exit surface 14bb thereof, it is transmitted through the dielectric multilayer film 14c and then through the prism 14a, exiting therefrom through the exit surface 14ab thereof, so as to be directed, as the light 21, further to the projection optical system 17 along the optical axis Lb. In this way, the projection light is separated from the illumination light.

However, as described earlier in connection with the prior art, normally, in a polarization beam splitter, as the angle of incidence varies, the transmittance varies greatly. Therefore, with illumination and projection light that fans out greatly, it is difficult to handle the illumination and projection light separately. To overcome this problem, according to the present invention, the plane of the figure at (α) in FIG. 1, i.e. the plane along which the dichroic mirrors separate colors (the light beams fan out as seen on this plane), is made substantially perpendicular to the plane of the figure at (β) in FIG. 1, i.e. the plane along which the PBS prism bends the light beams. This helps minimize the fanning out of the light beams as seen on the plane along which they are bent, and thereby makes it possible to achieve separation without degrading the characteristics of the PBS prism. Here, the degree of the fanning out of the light beams varies with the direction thereof, and therefore the projection lens has a pupil shaped like an ellipse.

FIG. 9B shows another example, in which a TIR prism is used. As shown in this figure, the TIR prism 22 is composed of two, bigger and smaller, prisms 22b and 22a, each having the shape of a triangular prism and made of glass or the like, that are arranged so as to face each other at their respective surfaces that correspond to the hypotenuses of isosceles triangles. The prism 22b has an entrance surface 22ba, a total-reflection surface 22bb serving also as an exit surface, and an entrance/exit surface 22bc; the prism 22a has an entrance surface 22aa and an exit surface 22ab. The total-reflection surface 22bb and the entrance surface 22aa, which correspond to the hypotenuses of isosceles triangles and which face each other, are arranged several micrometers to several tens of micrometers apart from each other.

Also with a TIR prism, if the light beams bent thereby fan out greatly, in the display panel 16 shown in the figure, the angle θ between the illumination and projection light needs to be made greater. However, making the angle θ greater spoils the axisymmetry of the projection lens to such a degree that it is impossible to obtain satisfactory optical performance. Accordingly, also here, as in the case described previously where a PBS prism is used, the plane along which the dichroic mirrors separate colors is made substantially perpendicular to the plane along which the TIR prism bends the light beams. This helps minimize the fanning out of the light beams as seen on the plane along which they are bent, and thereby makes it possible to achieve separation without degrading the characteristics of the TIR prism.

In a case where a TIR prism 22 as described above is used, as shown in FIG. 9B, first, the light 9 formed into substantially uniformly S-polarized light by the illumination optical system is directed to the prism 22b along the optical axis La so that the light 9 enters the prism 22b through the entrance surface 22ba thereof through a polarizing plate S that transmits only S-polarized light. Then, most of the light 9, striking the total-reflection surface 22bb at angles of incidence greater than the critical angle, is reflected therefrom, exits from the prism 22b through the entrance/exit surface 22bc thereof, and travels toward the display panel 16. Immediately in front of the display panel 16 is disposed the birefringent microcylinderlens array 15 that exerts the effect of microlenses on S-polarized light.

The display panel 16 is a reflection-type liquid crystal display panel that reflects pixel by pixel the light shone thereon with (for "on" pixels) or without (for "off" pixels) rotating the polarization plane thereof in accordance with the given display data. The portion of the reflected light that corresponds to "on" pixels is converted into P-polarized light, and therefore returns through the birefringent microcylinderlens array 15 to the prism 22b, entering it through the entrance/exit surface 22bc thereof. This light then strikes the total-reflection surface 22bb at angles of incidence smaller than the critical angle so as to be transmitted therethrough, is then transmitted through the prism 22a, entering it through the entrance surface 22aa thereof and exiting therefrom through the exit surface 22ab thereof, is then transmitted through a polarizing plate P that transmits only P-polarized light, and eventually reaches, as the light 21, the projection optical system 17 along the optical axis Lb. On the other hand, the portion of the reflected light that corresponds to "off" pixels remains S-polarized, and therefore, even though it is transmitted through the prisms 22b and 22a, it is eventually intercepted by the polarizing plate P. In this way, the projection light is separated from the illumination light.

Figure 10:
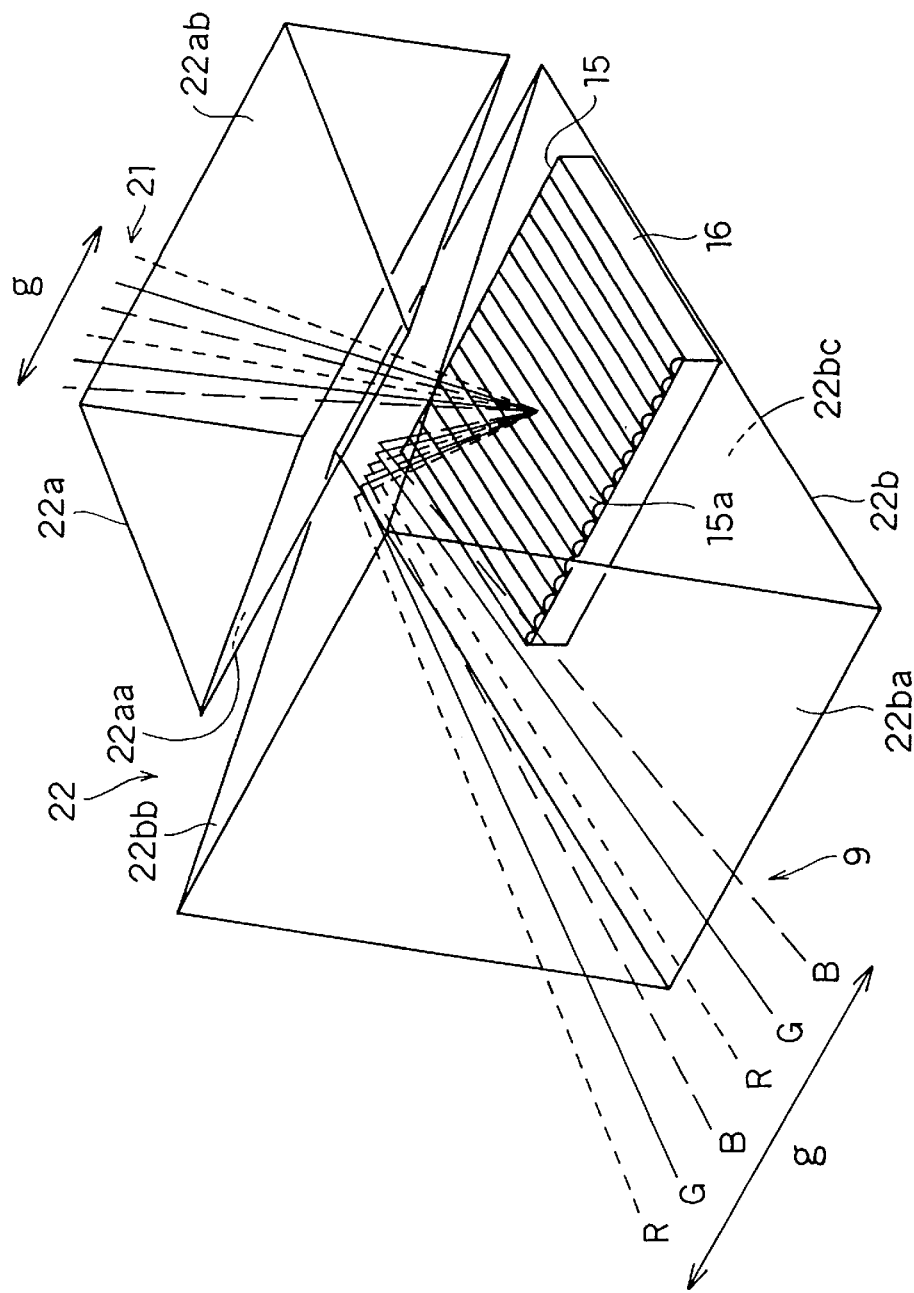
FIG. 10 is a perspective view schematically showing the construction of the TIR prism used in the first embodiment.

FIG. 10 is a perspective view schematically showing a construction that can be adopted in this embodiment when a TIR prism is used as the illumination/projection separation optical system. This construction is equivalent to that shown in FIG. 9B. However, in FIG. 10, the polarizing plates are not illustrated, and, in the following descriptions, no description will be given as to how they transmit or intercept light of particular polarization types. As shown in this figure, the light 9 directed from the second integrator (not shown here) to the TIR prism 22 at different angles for the R, G, and B components thereof enters the prism 22b through the entrance surface 22ba thereof. This light is then reflected from the total-reflection surface 22bb, then exits from the prism 22b through the entrance/exit surface 22bc thereof, and then travels toward the display panel 16. Immediately in front of the display panel 16 is disposed the birefringent microcylinderlens array 15.

The light reflected from the display panel 16 passes through the birefringent microcylinderlens array 15, then returns to the prism 22b, entering it through the entrance/exit surface 22bc, is then transmitted through the total-reflection surface 22bb, and is then transmitted through the prism 22a, entering it through the entrance surface 22aa thereof and exiting therefrom through the exit surface 22ab thereof as the light 21. Here, the individual microcylinderlenses 15a of the birefringent microcylinderlens array 15 act to limit the fanning out of the light 21, i.e. the projection light, to that occurring in the direction in which the light 9, i.e. the illumination light, is separated, as indicated by arrows g for each kind of light.

Figure 11:
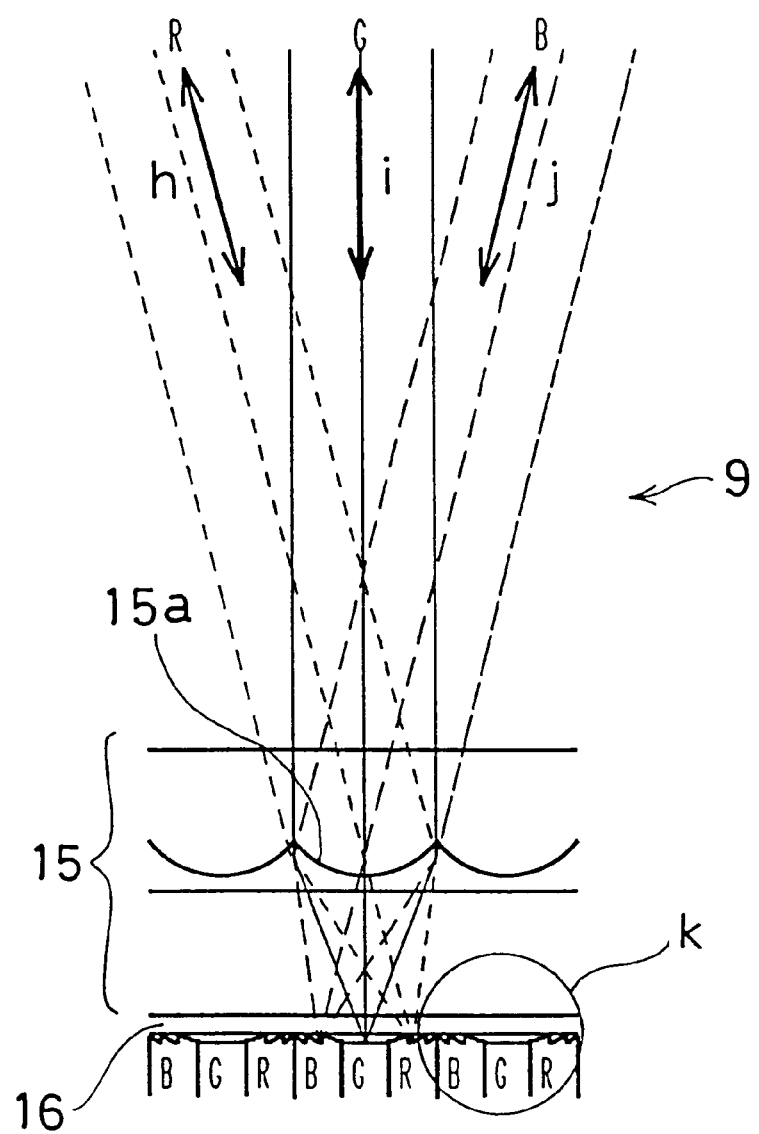
FIG. 11 is a diagram schematically showing the relationship between the microlens array and the display panel in the second embodiment.

FIG. 11 is a diagram schematically showing the relationship between the microlens array and the display panel in the second embodiment. As shown also in FIG. 2, immediately in front of the display panel 16 is disposed a microlens array 15. The display panel 16 here is of a so-called single-panel type, and has R, G, and B pixels arranged in a recurring pattern. The light 9 from the light source 1 is separated into R, G, and B light beforehand, and the thus separated R, G, and B light is directed at different angles into the individual microlenses 15a of the microlens array 15, separately for each pixel group (here, a pixel group denotes a set of three different, i.e. R, G, and B, pixels), so that the R, G, and B light is condensed individually onto the R, G, and B pixels of the display panel 16. In the figure, those parts of the microlens array 15 and the display panel 16 that extend further rightward and leftward are omitted.

Here, the display panel 16 is designed to exert a diffracting effect. The R, G, and B light illuminating the display panel 16 is reflected therefrom as projection light in such a way as to return to the PBS prism 14 (not shown here) by traveling individually along the same paths backward, as indicated by arrows h, i, and j, respectively, in the figure. Thus, the projection light is shone on the dielectric multilayer film 14d of the PBS prism 14 at the same angles of incidence as the illumination light, for all of R, G, and B light. This helps obtain satisfactory polarization separation characteristics.

Figure 12A:
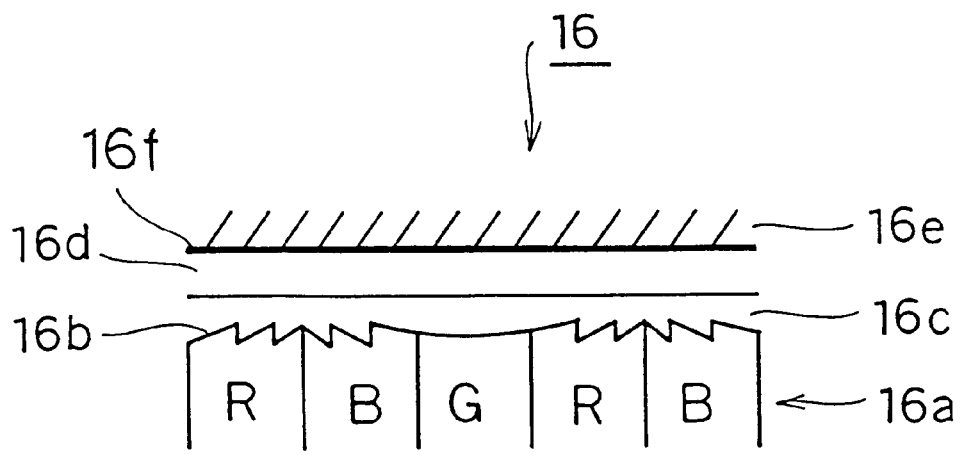
FIGS. 12A and 12B are diagrams schematically showing typical structures of the display panel exerting a diffracting effect employed in the second embodiment.
Figure 12B:
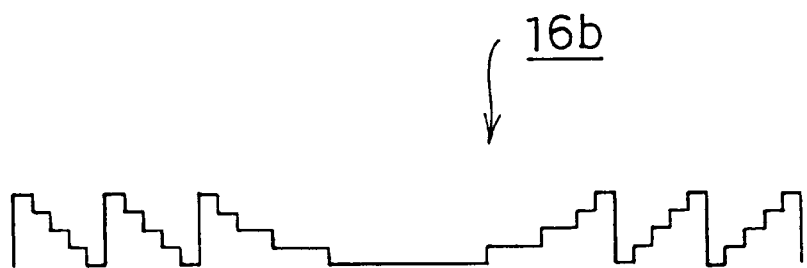

FIGS. 12A and 12B are diagrams schematically showing a practical structure of the display panel exerting a diffracting effect. This is an enlarged view of and around the encircled portion k shown in FIG. 11. As shown in FIG. 12A, the display panel 16, which is here a reflection-type liquid crystal display panel, has pixels 16a arranged in a bottom portion thereof, and has reflection-type diffraction gratings 16b formed, one for each pixel group, on the top surfaces (reflecting surfaces) of those pixels 16a. These reflection-type diffraction gratings 16b are made of aluminum, and serve also as an electrode. To fill the surface irregularities of the reflection-type diffraction gratings 16b, a transmissive material layer 16c made of a resin material or the like is laid on the top surfaces thereof. Further on top is formed a ferroelectric liquid crystal layer 16d, and still further on top is put an upper glass plate that is a transparent flat plate.

Between 16d and 16e, an upper transparent electrode layer 16f is formed. The reflection-type diffraction gratings 16b give the display panel 16 an optical power that exerts a diffracting effect when the display panel 16 reflects the illumination light. A reflection-type liquid crystal display device is manufactured by forming layers over one another just like an ordinary IC device. Accordingly, the reflection-type diffraction gratings 16b are produced by forming aluminum layers over one another in the shape of steps as shown in FIG. 12B. Here, three to four steps are formed, with the grating height kept uniform. The optical elements thus far described, starting with the light source 1 and ending with the microlens array 15, together constitute an illumination optical system.

Figure 13A:
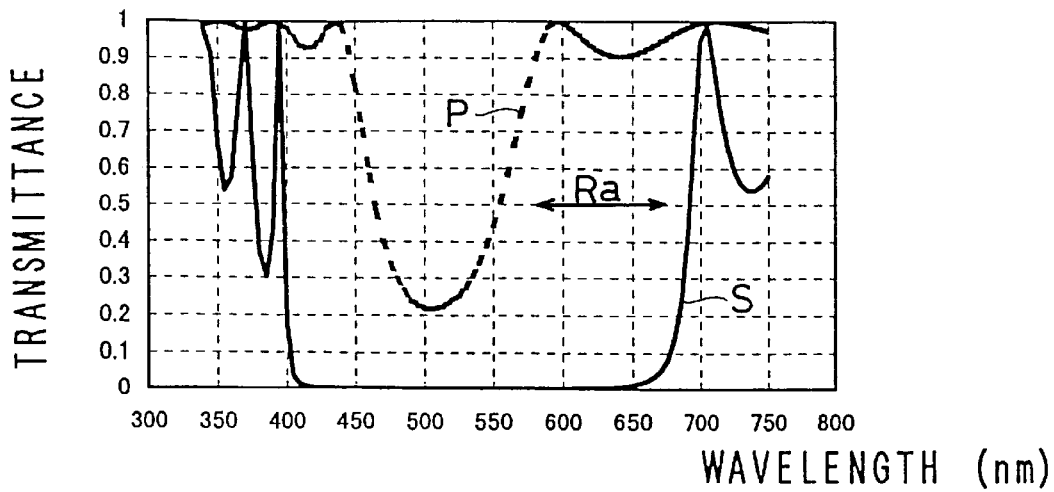
FIGS. 13A, 13B, and 13C are graphs showing the transmittance characteristics of the PBS prism used in the second embodiment.
Figure 13B:
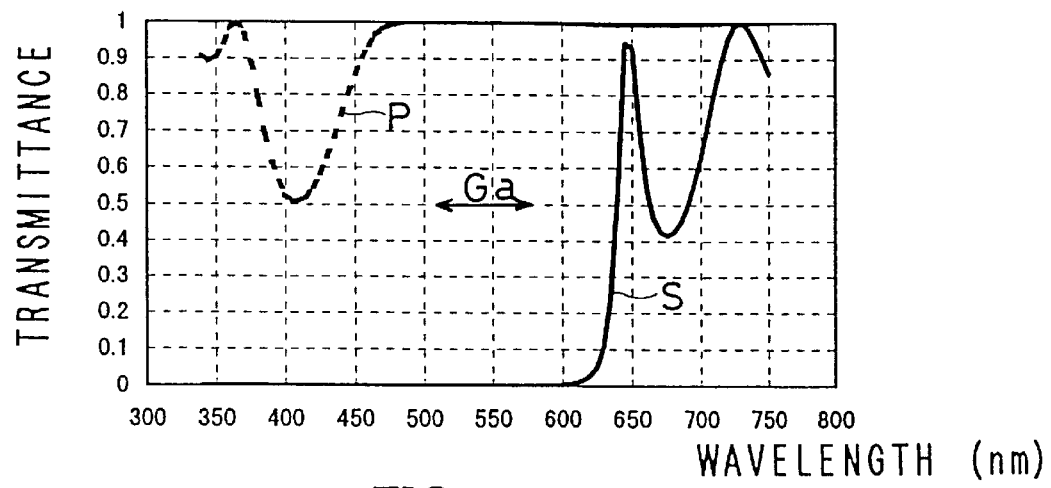
Figure 13C:
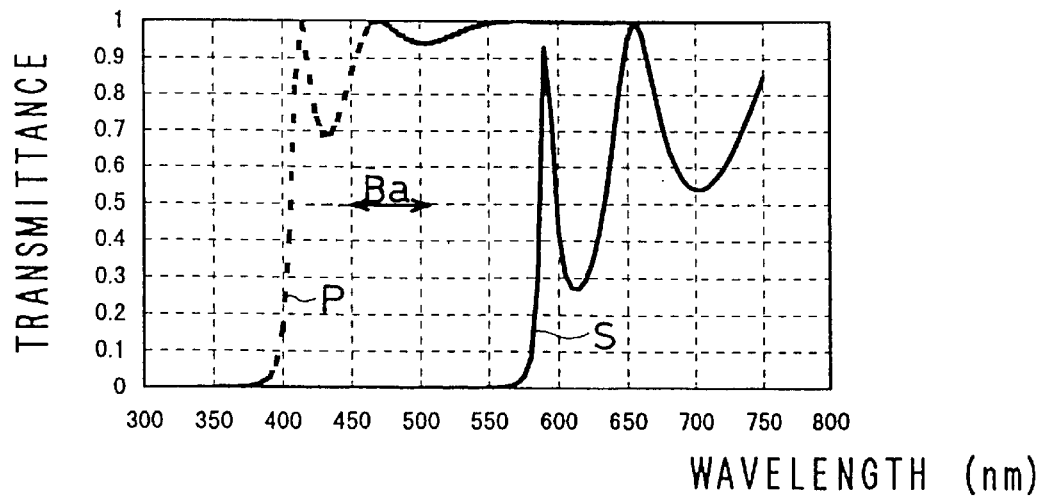

FIGS. 13A, 13B, and 13C are graphs showing the transmittance characteristics of the PBS prism used in this embodiment. FIGS. 13A, 13B, and 13C show cases in which the angle of incidence with respect to the dielectric multilayer film 14a of the PBS prism 14 is 40°, 50°, and 60°, respectively. In each graph, the wavelength, given in nm, of the light used is taken along the horizontal axis, and the transmittance is taken along the vertical axis. Moreover, the transmittance for P-polarized light is indicated by a broken curve P, and the transmittance for S-polarized light is indicated by a solid curve S.

As shown in FIG. 13A, when the angle of incidence is 40°, in the wavelength range of R (red) light indicated by an arrow Ra, for example from 580 to 670 nm, largely satisfactory transmittance is obtained for P-polarized light and largely satisfactory reflectance is obtained for S-polarized light (reflectance =1−transmittance). As shown in FIG. 13B, when the angle of incidence is 50°, in the wavelength range of G (green) light indicated by an arrow Ga, for example from 510 to 580 nm, largely satisfactory transmittance is obtained for P-polarized light and largely satisfactory reflectance is obtained for S-polarized light. As shown in FIG. 13C, when the angle of incidence is 600, in the wavelength range of B (blue) light indicated by an arrow Ba, for example from 450 to 510 nm, largely satisfactory transmittance is obtained for P-polarized light and largely satisfactory reflectance is obtained for S-polarized light.

As described above, R, G, and B light is shone on the dielectric multilayer film at increasingly large angles of incidence in this order, and the dielectric multilayer film is designed to exhibit characteristics that permit proper polarization separation of light of those different wavelength ranges that is shone thereon at such different angles of incidence. In this arrangement, even if the angle of incidence of the light incident on the PBS prism varies, and thus even if the transmittance for light of a given wavelength range incident thereon varies greatly, it is possible to maintain largely satisfactory polarization separation characteristics. Thus, it is possible to handle illumination and projection light separately by using an ordinary polarization beam splitter, and thereby simplify the construction of the illumination and projection optical systems.

It is possible to obtain satisfactory polarization separation characteristics, for example, by shining R (red), G (green), and B (blue) light on the dielectric multilayer film at angles of incidence 5 to 15° apart from one another, with G (green) light shone thereon at an angle of 45° or larger.

Table 1 shows the film structure of the dielectric multilayer film of the PBS prism used in this embodiment. In this table, Ni represents the refractive index of the ith layer. The optical film thickness is a dimensionless value based on the reference wavelength 650 nm. The 0th and 18th layers correspond to glass blocks constituting the PBS prism, and the 1st to 17th layers correspond to those of the dielectric multilayer film. That is, the dielectric multilayer film is sandwiched between glass blocks. The refractive indices of the 1st and 17th layers are made identical with those of the glass blocks in order to enhance and thereby ease the adhesion between them.

TABLE 1

|    | Ni    | Optical Film Thickness |
|----|-------|------------------------|
| 18 | 1.62  |                        |
| 17 | 1.62  | 0.125                  |
| 16 | 1.385 | 0.125                  |
| 15 | 2.3   | 0.250                  |
| 14 | 1.385 | 0.250                  |
| 13 | 2.3   | 0.250                  |
| 12 | 1.385 | 0.250                  |
| 11 | 2.3   | 0.250                  |
| 10 | 1.385 | 0.250                  |
| 9  | 2.3   | 0.250                  |
| 8  | 1.385 | 0.250                  |
| 7  | 2.3   | 0.250                  |
| 6  | 1.385 | 0.250                  |
| 5  | 2.3   | 0.250                  |
| 4  | 1.385 | 0.250                  |
| 3  | 2.3   | 0.250                  |
| 2  | 1.385 | 0.125                  |
| 1  | 1.62  | 0.125                  |
| 0  | 1.62  |                        |

What is claimed is:

1. A display optical apparatus comprising.

an illumination optical system, including a color separation device, for separating light polarized in a predetermined polarization direction into light of different wavelength ranges traveling in different directions by use of the color separation device and emitting the thus separated light as illumination light;

a reflection-type light modulation device for displaying an optical image;

an illumination/projection separation optical system for directing the illumination light emitted from the illumination optical system to the reflection-type light modulation device and for emitting light reflected from the reflection-type light modulation device as projection light;

a microcylinderlens array, disposed between the color separation device and the reflection-type light modulation device, for focusing the illumination light on the reflection-type light modulation device in such a way that light of different wavelength ranges is focused separately;

and a projection optical system for focusing the projection light emitted from the illumination/projection separation optical system on an image plane, wherein a plane including a central ray of the illumination light and a central ray of the projection light is substantially perpendicular to a plane including a direction in which the color separation device performs color separation.

2. A display optical apparatus as claimed in claim 1, wherein the illumination optical system includes a light source and a polarization conversion device for forming light from the light source into light polarized in a predetermined direction.

3. A display optical apparatus as claimed in claim 1, wherein the illumination/projection separation optical system is a total-reflection prism.

4. A display optical apparatus as claimed in claim 1, wherein the illumination/projection separation optical system is a polarization beam splitter.

5. A display optical apparatus comprising:

an illumination optical system, including a color separation device, for separating light polarized in a predetermined polarization direction into light of different wavelength ranges traveling in different directions by use of the color separation device and emitting the thus separated light as illumination light;

a reflection-type light modulation device for displaying an optical image;

a polarization beam splitter having a polarization separation surface for directing the illumination light emitted from the illumination optical system to the reflection-type light modulation device and for emitting light reflected from the reflection-type light modulation device as projection light, wherein the illumination light is shone on the polarization separation surface in such a way that light of shorter wavelengths is shone thereon at larger angles of incidence; and a projection optical system for focusing the projection light emitted from the polarization beam splitter on an image plane, wherein a plane including a central ray of the illumination light and a central ray of the projection light is substantially parallel to a plane including a direction in which the color separation device performs color separation.

6. A display optical apparatus as claimed in claim 5, wherein the illumination optical system includes a light source and a polarization conversion device for forming light from the light source into light polarized in a predetermined direction.

7. A display optical apparatus as claimed in claim 5, wherein the projection light emerges from the polarization separation surface of the polarization beam splitter in such a way that light of shorter wavelengths emerges therefrom at larger angles of emergence.

8. A display optical apparatus as claimed in claim 5, wherein the reflection-type light modulation device has, between the color separation device of the illumination optical system and the reflection-type light modulation device itself, a microlens array of which each lens corresponds to a group of three, R, G, and B pixels, and the reflection-type light modulation device has reflection-type diffraction gratings formed on reflecting surfaces of individual pixels thereof.

9. A display optical apparatus comprising:

an illumination optical system, including a color separation device, for separating received light polarized in a predetermined polarization direction into light of different wavelength ranges traveling in different directions by use of the color separation device and emitting the thus separated light as illumination light;

a reflection-type light modulation device for displaying an optical image;

a polarization beam splitter having a polarization separation surface for directing the illumination light emitted from the illumination optical system to the reflection-type light modulation device and for emitting light reflected from the reflection-type light modulation device as projection light, wherein the illumination light is shone on the polarization separation surface in such a way that light of shorter wavelengths is shone thereon at larger angles of incidence; and a projection optical system for focusing the projection light emitted from the polarization beam splitter on an image plane, wherein the color separation device includes three mirrors, wherein a received ray of the received light entering the color separation device and emission rays of said illumination light resulting from said received ray being separated are all coplanar rays, and wherein said emission rays include rays in a respective one of at least three different wavelength ranges.

* * * * *